United States Patent
Louis et al.

(10) Patent No.: US 10,567,366 B2
(45) Date of Patent: *Feb. 18, 2020

(54) SYSTEMS AND METHODS OF USER AUTHENTICATION FOR DATA SERVICES

(71) Applicant: Visa International Service Association, San Francisco, CA (US)

(72) Inventors: Brendan Xavier Louis, Manteca, CA (US); Craig O'Connell, San Mateo, CA (US); Karl Newland, Pacifica, CA (US); Douglas Fisher, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/215,227

(22) Filed: Dec. 10, 2018

(65) Prior Publication Data
US 2019/0109837 A1  Apr. 11, 2019

Related U.S. Application Data

(63) Continuation of application No. 15/141,155, filed on Apr. 28, 2016, now Pat. No. 10,187,366.

(51) Int. Cl.
*H04L 29/06* (2006.01)
*G06F 16/2457* (2019.01)

(52) U.S. Cl.
CPC ........ *H04L 63/08* (2013.01); *G06F 16/24575* (2019.01)

(58) Field of Classification Search
CPC ............... H04L 63/08; G06F 17/30528; G06F 16/24575

See application file for complete search history.

(56) References Cited

U.S. PATENT DOCUMENTS

| 2006/0272011 A1 | 11/2006 | Ide et al. |
| 2013/0197998 A1* | 8/2013 | Buhrmann ......... G06Q 30/0255 705/14.53 |
| 2013/0283356 A1* | 10/2013 | Mardikar ................ G06F 21/33 726/4 |
| 2016/0200233 A1 | 7/2016 | Guzman et al. |
| 2017/0318000 A1 | 11/2017 | Louis et al. |

OTHER PUBLICATIONS

U.S. Appl. No. 15/141,155, "Final Office Action", dated Jul. 3, 2018, 11 pages.
U.S. Appl. No. 15/141,155, "Non Final Office Action", dated Dec. 15, 2017, 11 pages.

* cited by examiner

*Primary Examiner* — Tri M Tran
(74) *Attorney, Agent, or Firm* — Kilpatrick Townsend & Stockton LLP

(57) ABSTRACT

Embodiments of the invention are directed to systems and methods of user authentication for data services. The data services may include accessing a tax return at the IRS, accessing or completing a student loan application, accessing a credit report, etc. User authentication data is collected by a data provider and provided to a server computer, and user device data is collected by the server computer after the user device accesses a resource identifier (e.g., URL) associated with the server computer. The user authentication data and/or user device data is analyzed and a risk score is generated.

14 Claims, 8 Drawing Sheets

US 10,567,366 B2

SYSTEMS AND METHODS OF USER AUTHENTICATION FOR DATA SERVICES

CROSS-REFERENCES TO RELATED APPLICATIONS

The present application is a continuation of U.S. patent application Ser. No. 15/141,155 filed on Apr. 28, 2016, the entire contents of which are herein incorporated by reference for all purposes.

BACKGROUND

Identity theft is a crime whereby criminals impersonate individuals, usually for financial gain. In today's society, one needs to reveal information (e.g., social security number, signature, name, address, phone number, cell number or even banking and credit card information) about oneself. If a thief is able to access this personal information, she can use it to commit fraud.

Using a person's personal information, a malicious person could do any number of things, like apply for loans or new credit card accounts. A thief could use counterfeit checks and debit cards or authorize electronic transfers in your name and wipe out funds in a bank account.

Identity theft can also go beyond a monetary impact. A thief can use one's information to obtain a driver's license or other documentation that would display their photo, but the authentic user's name and information. With these documents thieves could obtain a job and file fraudulent income tax returns, apply for travel documents, file insurance claims, or even provide another person's name and mailing address to police and other authorities if involved in other criminal activities.

The Internet is providing new ways for people to steal one's personal information and commit fraud. Many online entities such as the government, businesses, etc. store personal information about users. Thus, there is a need to help prevent thieves or unauthorized persons from accessing the personal data of legitimate users.

Embodiments of the invention address this and other problems, individually and collectively.

SUMMARY

Some embodiments of the present invention relate to user authentication systems and methods for accessing data services.

According to a method according to an embodiment of the invention, an authentication request message is received at a server computer system from a data provider computer. The authentication request message comprises user authentication data. The authentication request message is received after a user device previously contacted the data provider computer to access a data service. A response is transmitted from the server computer system to the data provider computer. The response includes a resource identifier such as a URL that is then transmitted from the data provider computer to the user device. Upon selecting or entering the resource identifier, the user device is redirected to the server computer system. User device data associated with the user device is received from the user device. User authentication data and user device data are analyzed, and a risk score is generated and transmitted. The server computer system may be configured to authenticate both users of data provider computers, as well as consumers in financial and non-financial transactions.

Embodiments of the invention are further directed to a server computer system comprising a processor and a memory element. The memory element can comprise code, executable by the processor, for implementing the above described method.

These and other embodiments of the invention are described in further detail below.

DETAILED DESCRIPTION

Figure 1:
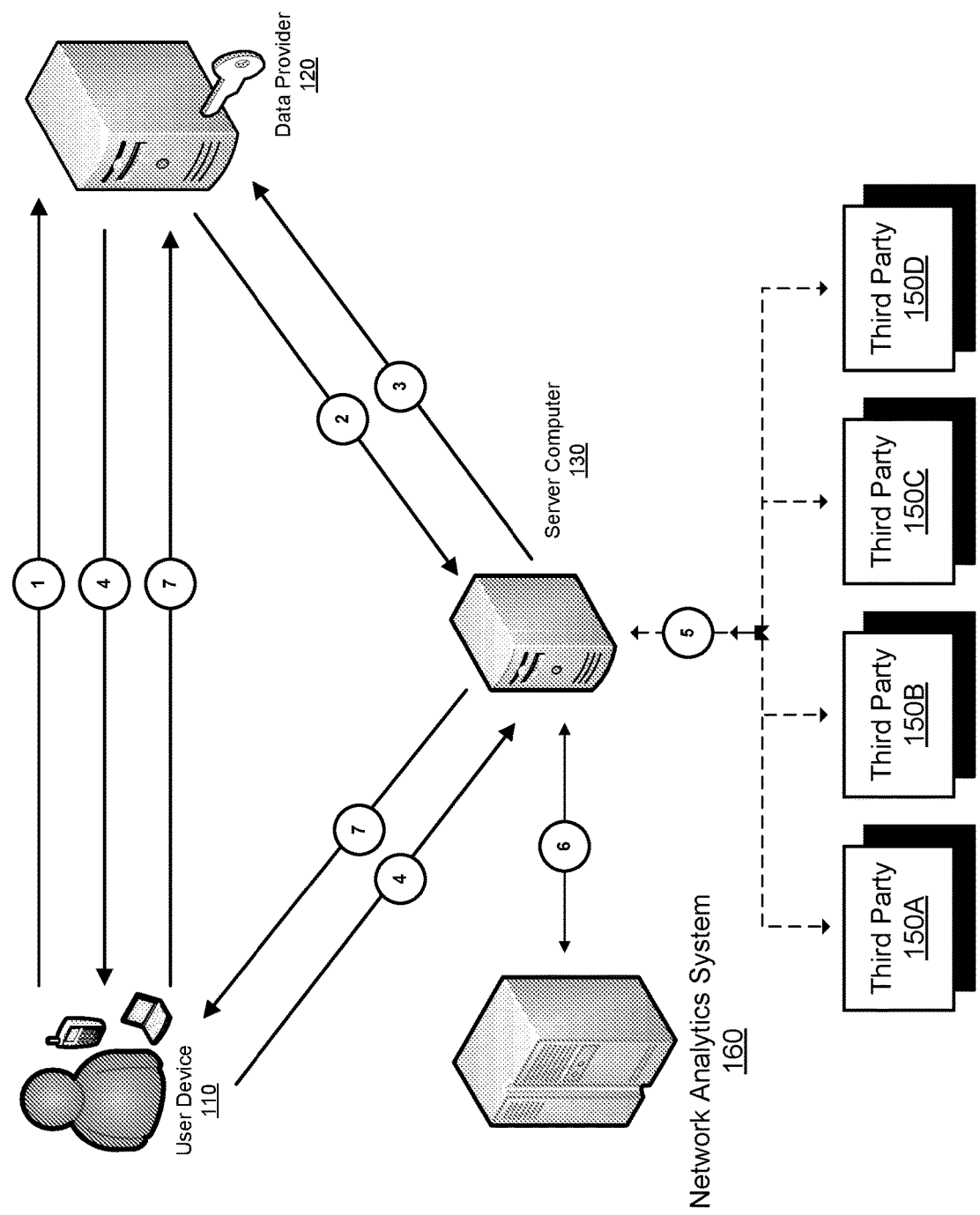
FIG. 1 shows a diagram of a system of user authentication for data services and a process flow illustrating a method for using the system according to embodiments of the present invention.

Embodiments of the invention are directed to systems and methods of user authentication for data services using an authentication system. The data services may include accessing a tax return at the IRS, accessing or completing a student loan application, accessing a credit report, etc. User authentication data is collected by a data provider and provided to a server computer, and user device data is collected by the server computer after the user device accesses a resource identifier (e.g., a URL) associated with the server computer. The user authentication data and/or user device data is analyzed and a risk score is generated.

Before discussing specific embodiments and examples, some descriptions of terms used herein are provided below.

"Authentication" may be a process of confirming that an entity (e.g., a user, a device, etc.) is who or what it claims to be.

A "data provider" may be any entity providing access to any data and/or any data service that does not directly relate to financial payment transactions conducted between a merchant and a consumer. Exemplary data providers include the IRS, credit bureaus, e-mail servers, loan providers, insurance companies, healthcare providers, mail or shipment providers, academic institutions, and the like. A data provider may comprise a server computer.

A "data service" may be any service provided to a user that does not directly relate to financial payment transactions conducted between a merchant and a consumer. Exemplary data services include providing an insurance quote, filing a tax return, registering for classes, applying for a loan, accessing healthcare records, accessing shipment/delivery records, accessing a credit report, accessing e-mail, confirming an age for a tobacco or alcohol purchase, and the like.

"Request data" may refer to any suitable data associated with a request (e.g., a request to access data or a data service, a request to perform a transaction, etc.) for data. Request data may include the time of the request, duration of the interaction, transmission method of the request, type of the request, type of data or transaction requested, location associated with the request, and any other information that is related to the request.

A "risk score" may include an arbitrary designation or ranking that represents the risk that a request and/or that the transaction to be conducted may be fraudulent. The risk score may be represented by a number (and any scale) or a probability, or in any other relevant manner of conveying such information. For example, a risk score may be a number between 1 and 100, where a lower number indicates that the transaction being conducted has a lower likelihood of fraud. The risk score may be derived from an aggregation of information about a request, including, for example, user authentication data, request data, and/or device data. The risk score may be used by any entity, such as a data provider, in determining whether to approve a request or allow access to data or a data service. The risk score may comprise and/or utilize both current information and past information, and may weigh such information in any suitable manner.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "server computer system" may include one or more server computers. In one example, a server computer system may include a network analytics system (e.g., 160 in FIG. 1) and a separate server computer (e.g., 130 in FIG. 1) in communication with each other. In another embodiment, a server computer system may include only one server computer (e.g., only 130 in FIG. 1).

A "third party" may refer generally to an entity or system that provides data. Exemplary third parties include fraud detection data providers, such as Fair Isaac Corporation (FICO®), EMC Corporation/RSA, as well as ThreatMetrix®, Department of Motor Vehicles, Experian®, and the like. A third party may be a source of data that is external to a particular system. In some embodiments, a third party may be located physically external from a system (e.g., in a separate physical location or separate computer) or computer that calculates or determines a risk score, or may be located in a distinct location within a physical memory component within the system. In one embodiment, a third party may be a source outside of a system firewall or located outside of a network of a system or entity. A third party may comprise a server computer.

A "resource identifier" can identify a resource. Examples of resource identifiers may include URIs (Uniform Resource Identifiers), URLs (Uniform Resource Locators), etc.

"URL" is a Uniform Resource Locator. A URL may be any suitable reference (e.g., an address) to a resource on the Internet. Any resource or file within a website may be specified with a URL, such as a web page, an image, a program or application, and the like.

"User authentication data" may include any suitable information about a user and/or a user request. Exemplary user authentication data may include name, username, password, physical address, e-mail address, phone number, social security number, place of employment, date of birth, payment or bank account number, marital status, income, demographic data, preference data, prior access request data, and the like. User authentication data may further include request data.

A "user device" may comprise any suitable electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of user devices include mobile phones (e.g., cellular phones), PDAs, tablet computers, net books, laptop computers, personal music players, handheld specialized readers, watches, fitness bands, ankle bracelets, rings, earrings, etc., as well as automobiles with remote communication capabilities. A user device may comprise any suitable hardware and software for performing such functions, and may also include multiple devices or components (e.g., when a device has remote access to a network by tethering to another device—i.e., using the other device as a modem—both devices taken together may be considered a single user device).

"User device data" may include any suitable information about a user device. Exemplary user device data may include device type, operating system, IP address, browser information, referrer URL, and the like.

FIG. 1 shows a system and method of user authentication for data services. The system includes a user device 110, a data provider 120, a server computer 130, one or more third parties 150A-D, and a network analytics system 160. Each of these systems and computers may be in operative communication with each other as shown. The user device 110 is operated by a user (not shown).

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the Internet), using any suitable communications protocol.

A user may operate user device 110 to make a request from data provider 120 at step 1. The request may relate to a data service (e.g., non-payment) type of transaction, such as to file an online tax return at the IRS, to complete a student loan application, to request medical records, etc. The request may be made in any suitable fashion, including over a network, such as through a website associated with data provider 120. In other examples, the user may make a request from data provider 120 by phone or over e-mail.

At step 2, data provider 120 sends an authentication request message of the user associated with user device 110 to server computer 130. The authentication request message comprises user authentication data collected from the user. The user authentication data may include the user's name, address, phone number, e-mail address, social security number, etc. The user authentication data may further include payment information (e.g., a payment account number, a CVV, a billing address, etc.) to further authenticate the identity of the user, even if payment is not necessary with the request.

In some embodiments, the user authentication data includes request data regarding the circumstances of the request. Request data may include the time of the request, the duration of the user's interaction with data provider 120, the type of request, the request method (e.g., website, e-mail, phone, etc.), the type of data or data service requested, etc. Although not specific to a particular user, request data may still be considered in determining risk, such as, for example, if a high percentage of high risk or fraudulent requests are made between 2:00 and 4:00 AM.

The user authentication data may further include past request data regarding the circumstances of past requests. This may be useful, for example, if this particular user has made many similar requests that were determined to be either fraudulent or authentic. For example, past request data may be analyzed to determine whether there is recent indication of fraud, or to detect patterns in the user's requests (e.g., the user regularly submits their tax return every April 15).

In one embodiment, the user authentication data may be collected from the user by data provider 120 concurrently with receipt of the request. In another embodiment, the user may be prompted to enter user authentication data after data provider 120 receives the request. In still another embodiment, data provider 120 may already have access to user authentication data when receiving the request, such as through a previously established user profile or user account with data provider 120. In one embodiment, user authentication data can be gathered from the user at more than one time using more than one method. For example, some user authentication data may be obtained from a user profile, in addition to the user being prompted later to enter additional user authentication data. This may be the case if the previously obtained user authentication data is incomplete or insufficient to generate a reliable risk score.

The authentication request message may further comprise an identifier associated with data provider 120. The data provider identifier may be any combination of letters and/or numbers that is unique to data provider 120. The identifier may be used by server computer 130 to retrieve a schema for processing the authentication request message from data provider 120, as described further herein with respect to FIG. 2. The schema may specify, for example, what types of third party data to collect and to avoid, as well as which third parties to obtain the data from, in determining a risk score associated with the request.

At step 3, server computer 130 transmits a response to data provider 120. The response includes a URL that will allow server computer 130 to collect user device data from user device 110 upon execution of the URL on the user device 110. In some embodiments, the URL is a unique URL specifically generated for user device 110, such that it would be difficult for unintended users on other user devices to provide user device data. In other embodiments, the URL is a general URL used for collecting authentication data from multiple user devices. In the latter embodiment, a user may be prompted to enter identifying information (e.g., name, phone number, etc.), so that the user device data collected from user device 110 can be associated with the correct user. In other embodiments, another type of resource identifier may be used other than a URL (e.g., a URI).

At step 4, data provider 120 transmits the URL to user device 110. A user may select or enter the URL into a browser on user device 110, establishing a connection between user device 110 and server computer 130. Server computer 130 collects user device data from user device 110, including, in some embodiments, an IP address of user device 110. This user device data may be collected "in the background" from user device 110 simply entering the proper URL and visiting the associated website. In other embodiments, visiting the URL may execute code or an application on user device 110 that causes user device 110 to transmit user device data to server computer 130.

Although shown and described as being routed through data provider 120, it is contemplated that server computer 130 may directly provide a URL to user device 110 in other embodiments. Server computer 130 may determine how to provide the URL to user device 110 based on the types of user authentication data available. For example, when the user authentication data provided to server computer 130 by data provider 120 includes a user phone number, server computer 130 may send the URL directly to user device 110 via text message. In another example, when the user authentication data provided to server computer 130 by data provider 120 includes a user e-mail address, server computer 130 may send the URL directly to user device 110 via e-mail.

At step 5, server computer 130 requests and receives third party data from one or more third parties 150A-D. The third parties 150A-D may be or may operate any system or entity providing data, particularly data relevant to authentication. In one embodiment, the type(s) of third party data requested is based on the type(s) of user authentication data received from data provider 120, and/or based on the type(s) of user device data collected from user device 110. For example, if the user device data includes an IP address, server computer 130 may request and receive IP address data and fraud analytics from an entity that provides IP address analytics services. In another example, if the user device data includes information about the components of the user device such as a serial number, IMEI number, model number, etc., then a manufacturer or service provider associated with the user device may provide third party data. If the user authentication data includes a social security number, server computer 130 may request and receive credit information and a credit score associated with the user from FICO®. In other words, any third party data may be requested that may be helpful in interpreting or analyzing the user authentication data and/or user device data. In other embodiments, other factors may be considered in selecting certain third parties or types of third party data to request, such as the cost of the data, the turnaround time for the data, etc.

In some embodiments, the type(s) of third party data requested, and/or the specific third parties from which to request data, is based on the schema for authentication associated with data provider 120, as indicated by the identifier contained in the authentication request message. If any additional third party data is received from one or more of third parties 150A-D that is not specified by the schema for authentication, it can be ignored (i.e., it will not be further processed or used to generate a risk score). For example, if the schema specifies that only IP address data should be used, no other types of third party data may be requested. However, if other types of third party data are requested and received, they may simply be ignored and not used for further analysis.

At step 6, server computer 130 sends the user authentication data, the user device data, and/or the third party data to network analytics system 160, and receives a risk score for the user's request. Specifically, network analytics system 160 may receive the request from server computer 130 for a risk score for the user's request to access a data service from data provider 120. Network analytics system 160 may then generate a risk score for the user's request by evaluating the user authentication data, the user device data, and/or the third party data, for example. In some embodiments, network analytics system 160 may further consider similar users' data corresponding to similar requests.

For example, there may be a low risk for the request if there have been no previous problems with the IP address used, no suspicious behavior by the particular user in the past request data, and/or there is a low risk in behavior based on similar users. On the other hand, there may be a high risk if there has been fraudulent activity associated with the IP address used, suspicious behavior by the particular user (e.g., frequently changing addresses or phone numbers), there is a high risk in behavior based on similar users, and/or the current request is for much more sensitive or high-value data than is typical.

In order to generate the risk score, network analytics system 160 may access and analyze fixed risk data tables and/or dynamic risk data tables according to one embodiment. The fixed risk data tables may include a plurality of risk tables that may include fraud reports, lists of high risk accounts, high risk device lists, high risk physical address lists, and/or high risk IP address lists. In some embodiments, the fixed risk data tables may include lists of low risk or safe accounts, devices, physical address, and IP addresses. The fixed risk data tables and dynamic risk data tables contain risk data for both payment and non-payment transactions.

The dynamic risk data tables may include risk indices, profiles, and/or velocity data. The risk indices may include lists of devices and IP addresses that have a high risk of fraudulent activity or have a high rate of previous fraudulent activity. The profiles may include lists of user accounts, digital wallets, financial accounts, user profiles, and the like. These profiles may be accessed to retrieve risk data associated with a given profile. The velocity data may include user request and/or transaction velocity data for specific devices, IP addresses, e-mail addresses, user accounts, financial accounts, digital wallets, and/or specific users. Additional velocity data may relate to physical addresses.

Once generated, the risk score for the request may be stored by network analytics system 160 in conjunction with any of the relevant user authentication data, user device data, and/or third party data. Thus, the risk score may be later used by network analytics system 160 to analyze future requests from the same or similar users. In this way, network analytics system 160 may produce risk scores with greater reliability as each successive risk score is based on a larger record of previous requests.

Although shown and described as being separate from server computer 130, it is contemplated that some or all of the functions of network analytics system 160 may be incorporated into server computer 130 in some embodiments.

At step 7, server computer 130 sends the risk score to data provider 120 through user device 110. In another embodiment, server computer 130 may send the risk score directly to data provider 120, bypassing user device 110. The latter embodiment may be useful, for example, in situations in which there is a high risk of the user tampering with the risk score prior to transmission to data provider 120, such as when the risk score is high. In one embodiment, server computer 130 may further analyze the risk score, and send a recommended response to data provider 120. The recommended response may recommend whether data provider 120 should allow user device 110 to access the originally requested data.

For example, if the risk score is above a threshold (e.g., 60%), the recommended response may indicate that data provider 120 should not allow user device 110 to access the originally requested data service. If the risk score is below a threshold (e.g., 40%), the recommended response may indicate that the data provider 120 should allow user device 110 to access the originally requested data service. In one embodiment, if the risk score is within a certain range (e.g., 40-60%), the recommended response may indicate that further authentication should be performed prior to allowing the user to access the originally requested data service. Any further authentication method or mechanism may be used to further authenticate the user and/or device. In one example, the systems and methods described herein may be used again after collecting additional or different user authentication data, user device data, and/or third party data.

Figure 2:
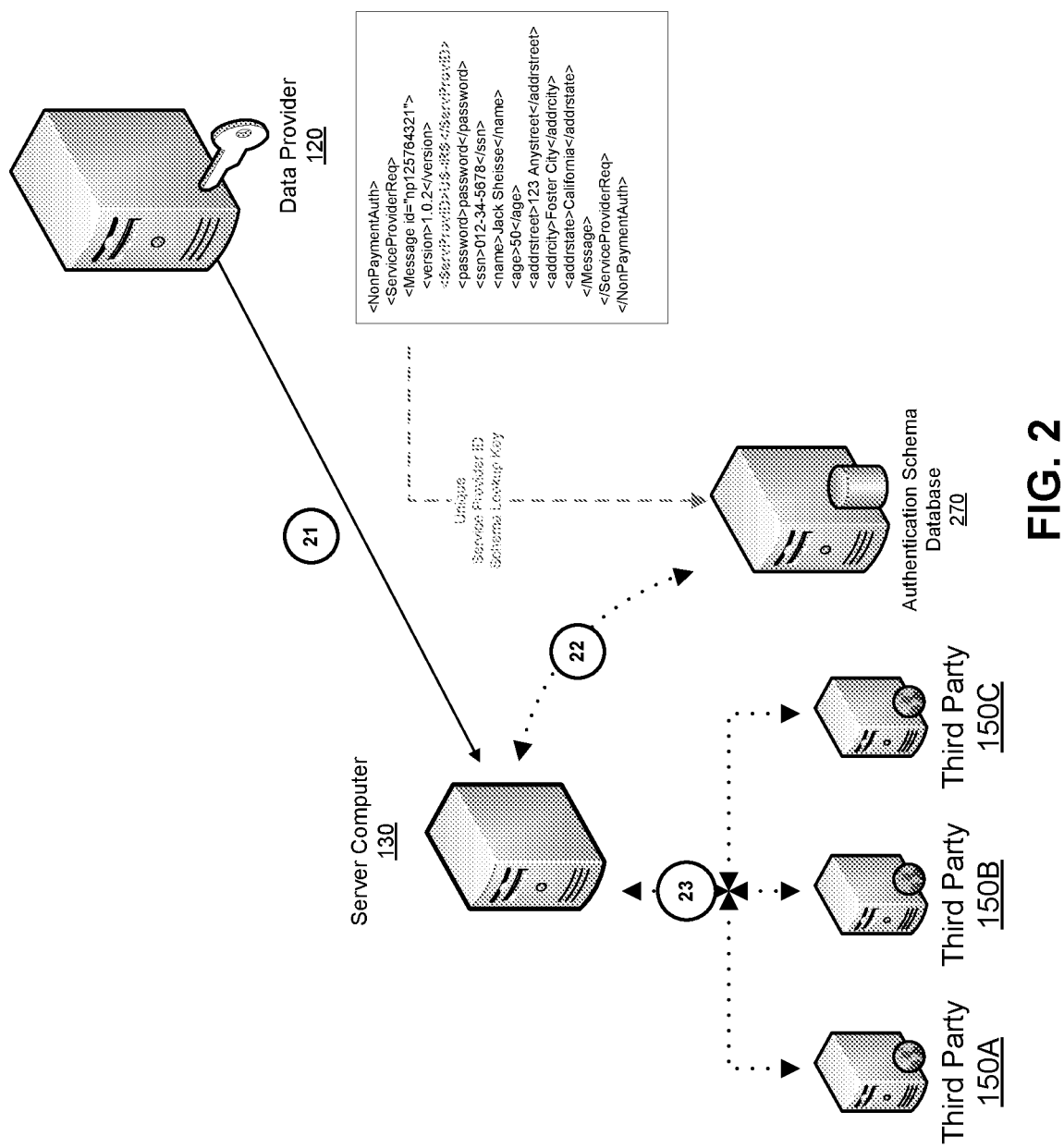
FIG. 2 shows a diagram of a system and a process flow illustrating a method for processing an authentication request message according to embodiments of the present invention.

FIG. 2 shows a system and method for processing an authentication request message in more detail according to embodiments of the present invention. FIG. 2 may be analogous to steps 2 and 5 of FIG. 1. The system includes data provider 120, server computer 130, and third parties 150A-C of FIG. 1. The system further includes authentication schema database 270, as described further herein.

At step 21, data provider 120 sends an authentication request message to server computer 130. The authentication request message may include user authentication data, e.g., password ("password"), social security number ("012-34-5678"), name ("Jack Sheisse"), age ("50"), street address ("123 Anystreet"), city ("Foster City"), and state ("California"). Although these particular types of user authentication data are illustrated as being included in the authentication request message, it is contemplated that additional or less types of user authentication data can also be included. The authentication request message may further include an identifier associated with data provider 120, e.g. ServProvID ("US-IRS"). The identifier may be a unique code associated only with data provider 120.

At step 22, server computer 130 may retrieve a schema for authentication associated with data provider 120 from authentication schema database 270 using the identifier. The schema may be stored in authentication schema database 270 in conjunction with the identifier. The schema may specify one or more attribute requirements associated with data provider 120, such as callout requirements to be made to third parties 150A-C to gather third party data. Server computer 130 may further use the identifier to retrieve a message schema from a message schema database (not shown) that allows server computer 130 to parse the authentication request message into its respective fields. For example, the message schema may indicate that the third field specified in the message corresponds to the identifier, while the fourth through tenth fields specified in the message correspond to the user authentication data.

At step 23, server computer 130 may request and receive third party data from third parties 150A-C according to the authentication schema associated with the identifier. For example, the authentication schema may specify specific third parties 150A-C from which to request third party data. In another example, the authentication schema may specify specific types of third party data to request from third parties 150A-C. For example, the authentication schema may indicate that only IP address analytics needs to be requested from third parties 150A-C because, for example, the particular data provider 120 receives requests from fraudulent IP addresses most frequently.

Figure 3:
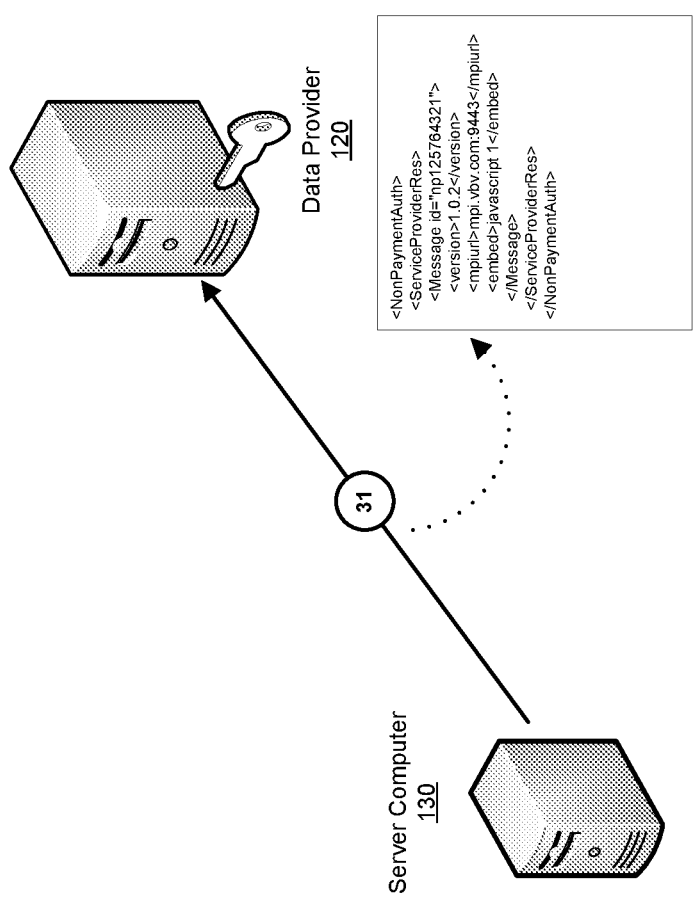
FIG. 3 shows a diagram of a system and a process flow illustrating a method for processing a response to the authentication request message according to embodiments of the present invention.

FIG. 3 shows a system and method for processing a response to the authentication request message according to embodiments of the present invention. FIG. 3 may be analogous to step 3 of FIG. 1. The system includes server computer 130 and data provider 120 of FIG. 1. At step 31, server computer 130 sends a response to the authentication request message to data provider 120. The response includes a URL and/or embedded code (e.g., JavaScript, Flash, etc.) for data provider 120 to provide to user device 110 that, upon execution, will collect user device data from user device 110, as described further above with respect to FIG. 1.

For example, the website pointed to by the URL may contain embedded code that performs packet inspections and/or browser and operating system profiling. The packet inspections may examine individual packets in the TCP/IP packet headers. The data from the packets may be compared to subsequently received packets to establish attribution to the operating system and/or connection. Profiling may be done by comparing device attributes received from different sources (e.g., JavaScript, Flash, HTTP, TCP/IP, etc.) to confirm the user device data from each source.

The authentication request message (and other messages shown in FIGS. 3-6) may also comprise an indication that this is a data service or "non-payment" authentication request message (e.g., "<NonPayment Auth>"). In some embodiments of the invention, parts of the authentication system described could be used to authenticate consumers in payment transactions. Thus, such authentication request messages can be sent to the server computer 130 to distinguish between non-payment (e.g., data service) and payment related authentication requests.

Figure 4:
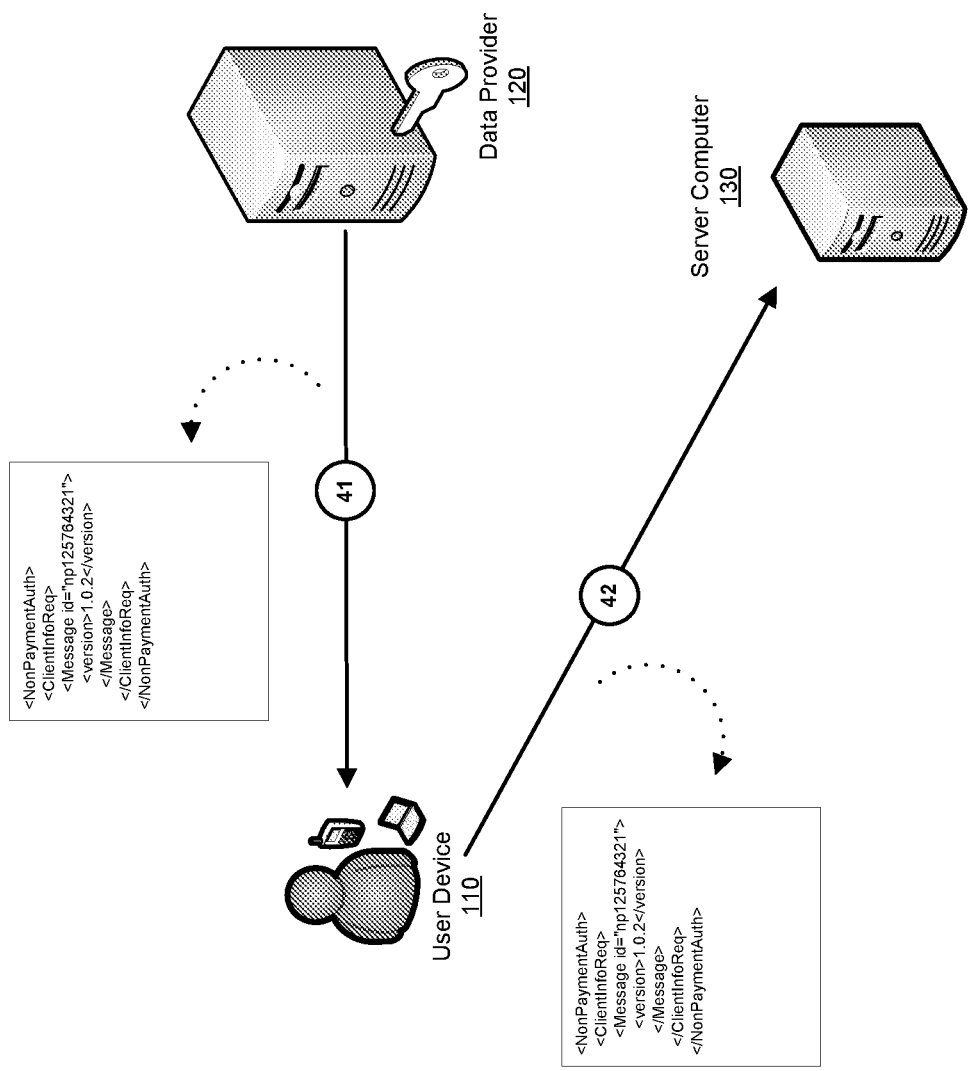
FIG. 4 shows a diagram of a system and a process flow illustrating a method for processing a user device data request message according to embodiments of the present invention.

FIG. 4 shows a system and method for processing a user device data request message according to embodiments of the present invention. FIG. 4 may be analogous to step 4 of FIG. 1. The system includes user device 110, data provider 120, and server computer 130 of FIG. 1. At step 41, data provider 120 sends a user device data request message including the URL and/or the embedded code to user device 110. Upon executing the embedded code and/or entering or selecting the URL, user device data is collected from user device 110, such as device IP address, device ID, browser type, browser version, referrer URL, etc. At step 42, the user device data is transmitted from user device 110 to server computer 130.

Figure 5:
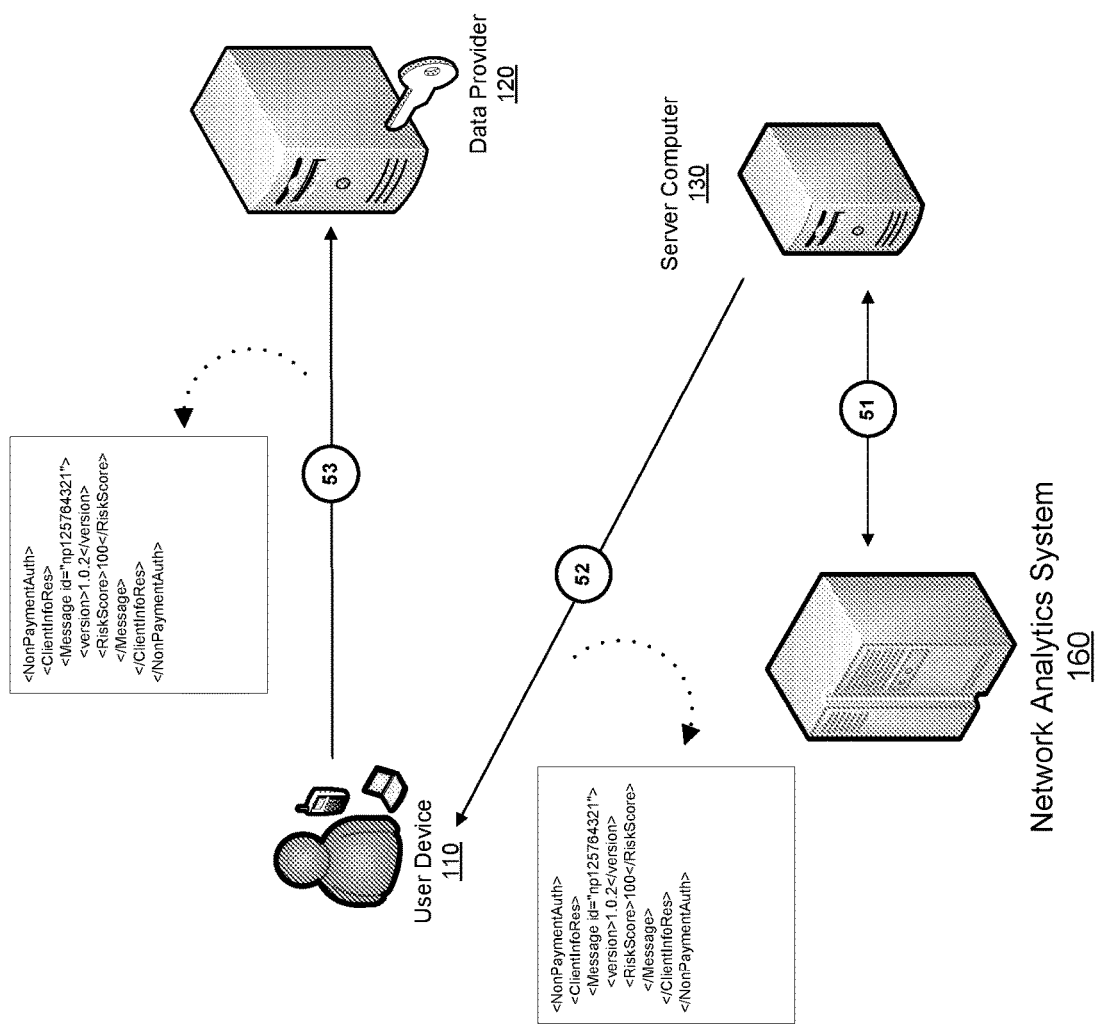
FIG. 5 shows a diagram of a system and a process flow illustrating a method for processing a user device data response message according to embodiments of the present invention.

FIG. 5 shows a system and method for processing a user device data response message according to embodiments of the present invention. FIG. 5 may be analogous to steps 6 and 7 of FIG. 1. The system includes user device 110, data provider 120, server computer 130 and network analytics system 160 of FIG. 1.

At step 51, server computer 130 provides user authentication data, user device data, and/or third party data to network analytics system 160, and receives a risk score in response, as described further herein with respect to FIG. 1. In some embodiments, server computer 130 and network analytics system 160 are combined into one entity. At step 52, server computer 130 provides the risk score to user device 110. In one embodiment, server computer 130 further provides a recommendation regarding whether or not to allow user device 110 to access the originally requested data service.

At step 53, user device 110 provides the risk score to data provider 120, which decides whether or not to allow user device 110 to access the originally requested data service based on the risk score. In some embodiments, the risk score (and/or the recommendation) may be provided directly from server computer 130 to data provider 120, without going through user device 110.

Figure 8:
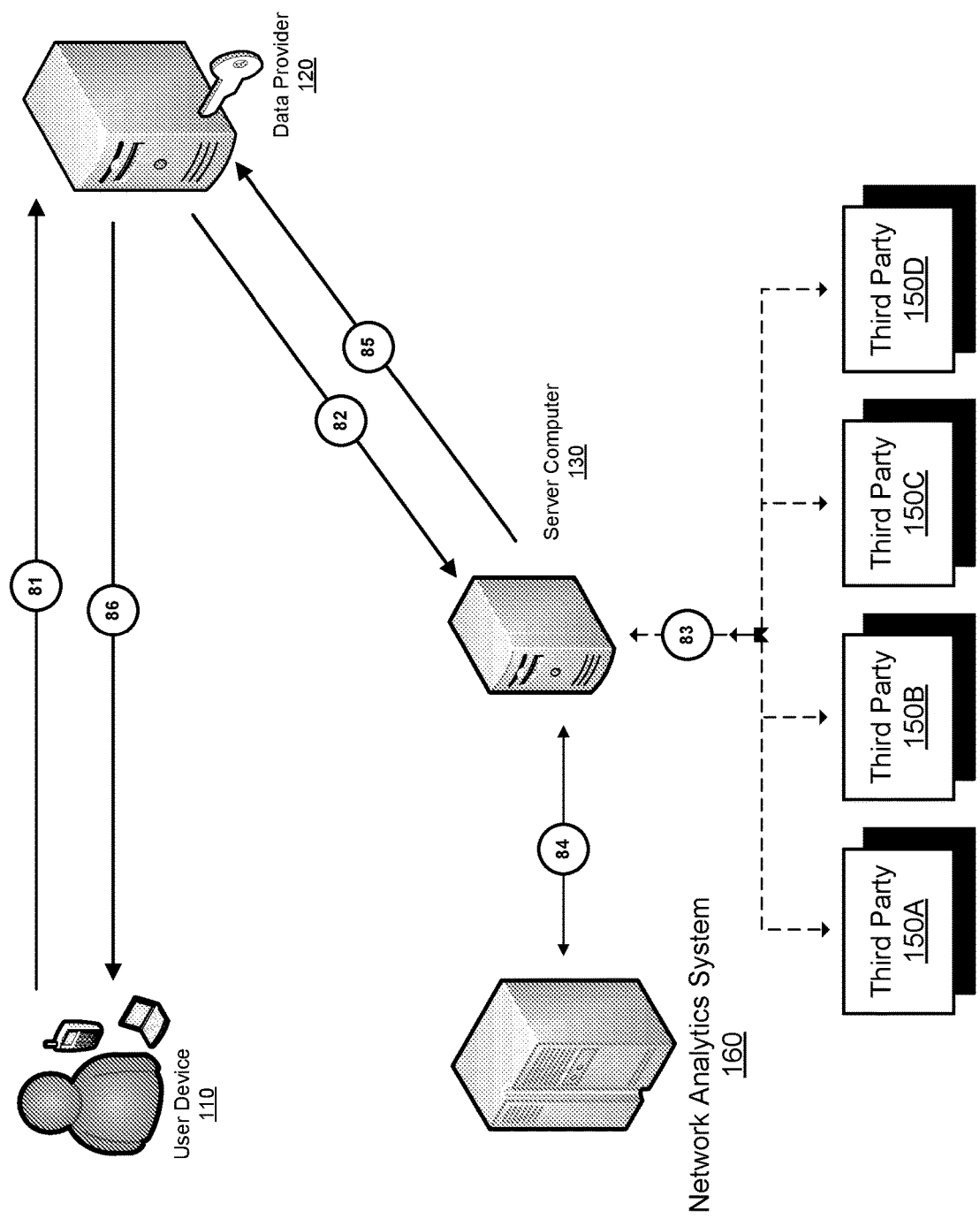
FIG. 8 shows a diagram of another system of user authentication for data services and a process flow illustrating a method for using the system according to embodiments of the present invention.

FIG. 8 shows another system and method of user authentication for data services according to embodiments of the present invention. A user may operate user device 110 to make a request to access a data service from data provider 120 at step 81. In this embodiment, the request includes user device data. In other words, the user device data is collected directly from the user device 110 by data provider 120. In one embodiment, the user device data is collected through the user's normal interactions with the data provider 120 (e.g., on a website), without the need for additional steps to collect the user device data. In this sense, FIG. 8 reflects a frictionless process that is seamless and transparent to the user.

At step 82, data provider 120 sends an authentication request message of the user associated with the user device 110 to server computer 130. The authentication request message comprises user authentication data collected from the user (and, in some embodiments, request data), and the user device data collected from the user device 110. The user authentication data may have been provided by the user with the initial request at step 81, or may have been previously provided to data provider 120 when establishing an account or the like, as described further herein with respect to FIG. 1. The authentication request message may further comprise an identifier associated with data provider 120, as described herein with respect to FIG. 1.

At step 83, server computer 130 requests and receives third party data from one or more third parties 150A-D, as described herein with respect to FIG. 1. At step 84, server computer 130 sends the user authentication data, the user device data, and/or the third party data to network analytics system 160, and receives a risk score for the user's request, as described herein with respect to FIG. 1.

At step 85, server computer 130 directly sends the risk score to data provider 120. In another embodiment, server computer 130 may send the risk score to data provider 120 through user device 110, such as is shown in FIG. 1. In one embodiment, server computer 130 may further analyze the risk score, and send a recommended response to data provider 120. The recommended response may recommend whether data provider 120 should allow user device 110 to access the originally requested data, as described herein with respect to FIG. 1.

At step 86, data provider 120 returns a result to user device 110. The result may be consistent or inconsistent with the recommended response provided by server computer 130, if provided. If data provider 120 determines that the request for the data service should be fulfilled, the result may be providing user device 110 access to the data service. If data provider 120 determines that the request for the data service should be denied, the result may be providing user device 110 with a denial message. If data provider 120 is unable to make a determination about whether the request for the data service should be fulfilled (e.g., there is a moderate level of risk associated with the request), the result may be requesting further authentication data from the user through user device 110 in order to complete the same or a different authentication process. In one embodiment, data provider 120 further provides user device 110 with the risk score.

Figure 6:
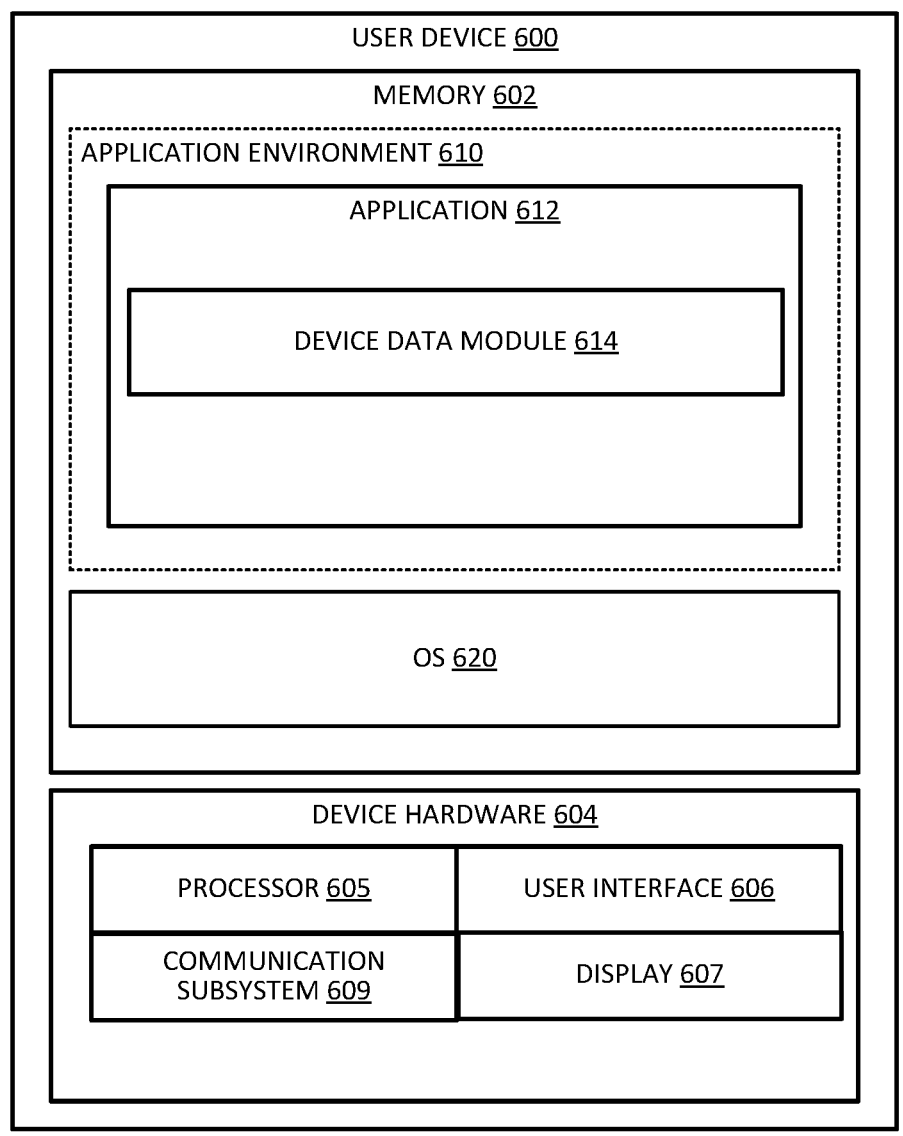
FIG. 6 shows a block diagram of a user device according to embodiments of the present invention.

FIG. 6 shows a block diagram of a user device 600 according to embodiments of the present invention. User device 600 may be used to implement user device 110 of FIG. 1, for example. User device 600 may include device hardware 604 coupled to a memory 602. Device hardware 604 may include a processor 605, a communications subsystem 609, and a user interface 606. In some embodiments, device hardware 604 may include a display 607 (which can be part of user interface 606). Processor 605 can be implemented as one or more integrated circuits (e.g., one or more single core or multicore microprocessors and/or microcontrollers), and is used to control the operation of user device 600. Processor 605 can execute a variety of programs in response to program code or computer-readable code stored in memory 602, and can maintain multiple concurrently executing programs or processes. Communications subsystem 609 may include one or more RF transceivers and/or connectors that can be used by user device 600 to communicate with other devices and/or to connect with external networks. User interface 606 can include any combination of input and output elements to allow a user to interact with and invoke the functionalities of user device 600. In some embodiments, user interface 606 may include a component such as display 607 that can be used for both input and output functions.

Memory 602 can be implemented using any combination of any number of non-volatile memories (e.g., flash memory) and volatile memories (e.g., DRAM, SRAM), or any other non-transitory storage medium, or a combination thereof media. Memory 602 may store an operating system (OS) 620 and an application environment 610 where one or more applications reside including application 612 to be executed by processor 605.

Application 612 can include an application that collects device data. Application 612 may include a device data module 614. Device data module 614, working in conjunction with the processor 605, may collect data relating to user device 600, such as device type, operating system, IP address, browser information, etc. Device data module 614 may be invoked upon accessing a particular resource identifier (e.g., URL) and/or by executing particular code.

Figure 7:
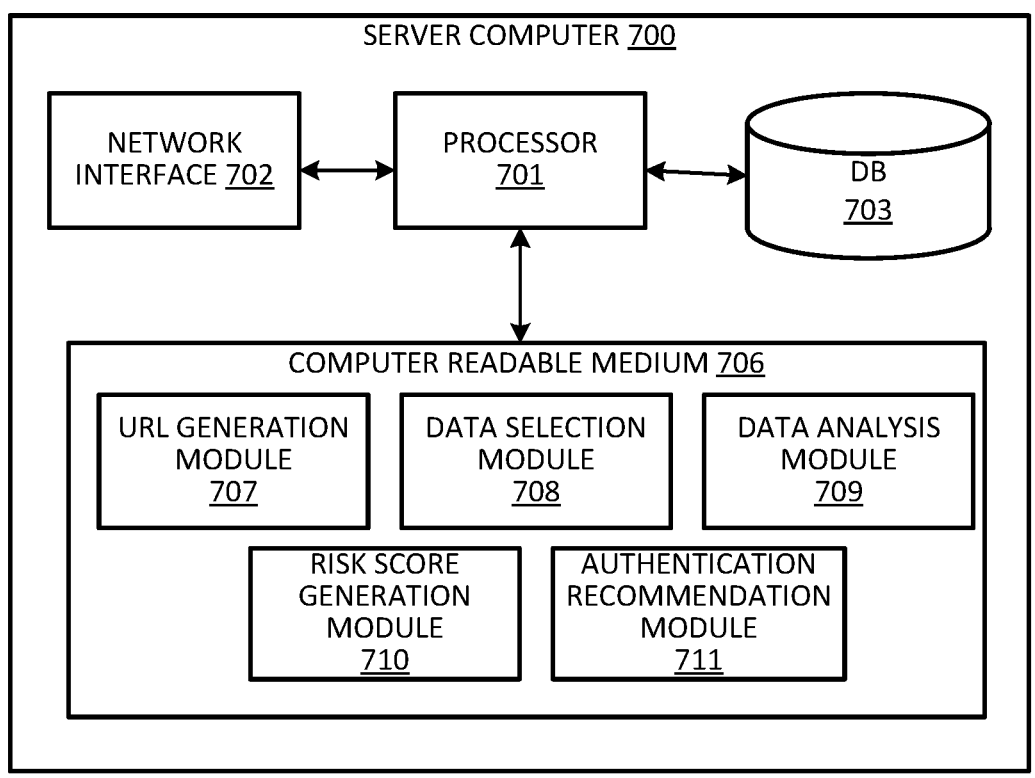
FIG. 7 shows a block diagram of a server computer according to embodiments of the present invention.

FIG. 7 shows a block diagram of a server computer 700 according to embodiments of the present invention. Server computer 700 may be used to implement server computer 130 and/or network analytics system 160 of FIG. 1, for example, and can be used to authenticate both consumers in a payment context, as well as users in a data service context. In the embodiment shown in FIG. 7, server computer 700 is capable of performing the functions of both server computer 130 and network analytics system 160 of FIG. 1.

Server computer 700 may include a processor 701 coupled to a network interface 702 and a computer readable medium 706. Processor 701 may include one or more microprocessors to execute program components for performing the various functions of server computer 700. Network interface 702 may be configured to connect to one or more communication networks to allow server computer 700 to communicate with other entities such as a user device, a data provider 120, third parties 150A-D, etc. Computer readable medium 706 may include any combination of one or more volatile and/or non-volatile memories, for example, RAM, DRAM, SRAM, ROM, flash, or any other suitable memory components. Computer readable medium 706 may store code executable by the processor 701 for implementing some or all of the functions of server computer 700 described herein. For example, computer readable medium 706 may include a URL generation module 707, a data analysis module 708, a risk score generation module 709, a data selection module 710, and/or an authentication recommendation module 711.

URL generation module 707 may, in conjunction with the processor 701, generate a URL (or other resource identifier) that will allow server computer 700 to collect user device data. The URL may point to a website containing embedded code that, when executed on a user device, collect user device data. The user device data can then be transmitted back to server computer 700.

Data selection module 708 may, in conjunction with the processor 701, select which type(s) of third party data to request from third parties to supplement the collected user authentication data and user device data. In one embodiment, the type(s) of third party data selected is based on the user authentication data and/or the user device data received. Alternatively or additionally, the type(s) of third party data selected is based on a schema for authentication associated with a data provider. For example, the schema may specify that the data provider only wants to consider credit score data. In this example, any additional data (outside of the credit score data) that is received from third parties may be ignored. In another example, no additional data (outside of the credit score data) will be requested.

Data analysis module 709 may, in conjunction with the processor 701, aggregate and analyze the user authentication data, the user device data, and/or the third party data. For example, data analysis module 709 may, in conjunction with the processor 701, access fixed risk data tables and/or dynamic risk data tables as described further herein with respect to FIG. 1 to retrieve and analyze risk data associated with the collected data for both payment and non-payment (e.g., data service) transactions.

Risk score generation module 710 may, in conjunction with the processor 701, generate a risk score based on the output of data analysis module 709. For example, risk score generation module 710 may assign a numerical value to a user's request for a data service or a consumer's request for a payment transaction (e.g., 0 to 100, with 100 being the highest risk), based on the available risk data. In another example, risk score generation module 710 may assign a letter value to the user's request (e.g., A to F, with F being the highest risk), based on the risk data. In still another example, risk score generation module 710 may assign a word or phrase to the user's request (e.g., "high risk", "moderate risk", "low risk", etc.). However, it is contemplated that any scale or indicator may be implemented by risk score generation module 710.

Authentication recommendation module 711 may, in conjunction with the processor 701, generate a recommended response for the data provider to make to the user device requesting the data service. The recommended response may recommend whether the data provider should allow the user device to access the requested data service, based on the output of risk score generation module 710.

For example, if the generated risk score indicates that the user's request for a data service is high risk, authentication recommendation module 711 may, in conjunction with the processor 701, generate a recommendation that the request be denied. In another example, if the generated risk score indicates that the user's request for a data service is low risk, authentication recommendation module 711 may, in conjunction with the processor 701, generate a recommendation that the request be allowed.

In one embodiment, if the generated risk score indicates that the user's request is moderate risk, other data may be considered in conjunction with the risk score prior to making a recommendation. In one embodiment, the sensitivity or confidentiality of the underlying data or data service being requested may be considered. For example, authentication recommendation module 711 may, in conjunction with the processor 701, recommend that a moderate risk request be denied if the requested data contains social security numbers, payment account numbers, etc. In an additional or alternative embodiment, authentication recommendation module 711 may, in conjunction with the processor 701, recommend that further authentication processing be performed for a moderate risk request.

Similarly, authentication recommendation module 711 may, in conjunction with the processor 701, generate a recommended response for a merchant to a consumer requesting a transaction based on the output of the risk score generation module 710.

A computer system may be used to implement any of the entities or components described above. The subsystems of the computer system may be interconnected via a system bus. Additional subsystems such as a printer, keyboard, fixed disk (or other memory comprising computer readable media), monitor, which is coupled to display adapter, and others may be used. Peripherals and input/output (I/O) devices, which couple to an I/O controller (which can be a processor or other suitable controller), can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium. In some embodiments, the monitor may be a touch sensitive display screen.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed:

1. A method comprising:
    transmitting, by a user device and to a data provider computer, a request to access a data service associated with an authentication request message comprising user authentication data from the data provider computer, the authentication request message further comprising an identifier that indicates a schema for authentication associated with the data provider computer;
    receiving, by the user device and from the data provider computer, a response that includes a resource identifier, the user device thereafter executing the resource identifier thereby causing the user device to be redirected to a server computer system;
    transmitting, by the user device and to the server computer system, user device data characteristics of the user device from the user device upon execution of the resource identifier on the user device, wherein the server computer system is caused to:
        request a portion of third party data from a particular third party computer based at least in part on the schema;
        generate a risk score based at least in part on the user authentication data, user device data associated with the user device data characteristics, and the portion of the third party data; and
    receiving, by the user device and from the data provider computer, a recommended response based at least in part on the risk score against a threshold, wherein the recommended response was previously transmitted to the data provider computer by the server computer system, and wherein the recommended response comprises one of at least allowing the user device to access the data service, requesting further authentication from the user device, or not allowing the user device to access the data service.

2. The method of claim 1, wherein the resource identifier is a URL.

3. The method of claim 1, wherein the server computer system is further cause to:
request and receive third party data selected based on the user authentication data and the user device data from the particular third party computer.

4. The method of claim 3, wherein the particular third party computer is not the user device, the server computer system, or the data provider computer.

5. The method of claim 3, wherein the third party data is requested based on the schema for authentication associated with the data provider computer.

6. The method of claim 1, wherein the risk score is transmitted by the server computer system to at least one of the user device or the data provider computer.

7. The method of claim 1, wherein the server computer system comprises a server computer and a network analytics system.

8. A user device comprising:
a processor; and
a memory element comprising code, executable by the processor, for implementing a method comprising:
transmitting, to a data provider computer, a request to access a data service associated with an authentication request message comprising user authentication data from the data provider computer, the authentication request message further comprising an identifier that indicates a schema for authentication associated with the data provider computer;
receiving, from the data provider computer, a response that includes a resource identifier, the user device thereafter executing the resource identifier thereby causing the user device to be redirected to a server computer system;
transmitting, to the server computer system, user device data characteristics of the user device from the user device upon execution of the resource identifier on the user device, wherein the server computer system is caused to:
request a portion of third party data from a particular third party computer based at least in part on the schema;
generate a risk score based at least in part on the user authentication data, user device data associated with the user device data characteristics, and the portion of the third party data; and
receiving, from the data provider computer, a recommended response based at least in part on the risk score against a threshold, wherein the recommended response was previously transmitted to the data provider computer by the server computer system, and wherein the recommended response comprises one of at least allowing the user device to access the data service, requesting further authentication from the user device, or not allowing the user device to access the data service.

9. The user device of claim 8, wherein the resource identifier is a URL.

10. The user device of claim 8, wherein the server computer system is further caused to request and receive third party data selected based on the user authentication data and the user device data from the particular third party computer.

11. The user device of claim 10, wherein the particular third party computer is not the user device, the server computer system, or the data provider computer.

12. The user device of claim 10, wherein the third party data is requested based on the schema for authentication associated with the data provider computer.

13. The user device of claim 8, wherein the risk score is transmitted by the server computer system to at least one of the user device or the data provider computer.

14. The user device of claim 8, wherein the server computer system comprises a server computer and a network analytics system.

* * * * *